Sept. 22, 1964    M. J. MERRICK    3,149,903
OPTICAL APPARATUS

Filed Dec. 29, 1960    3 Sheets-Sheet 1

INVENTOR.
Maurice J. Merrick
BY
Buckhorn, Cheatham & Blore
ATTORNEYS

Sept. 22, 1964     M. J. MERRICK     3,149,903
OPTICAL APPARATUS

Filed Dec. 29, 1960     3 Sheets-Sheet 2

INVENTOR.
Maurice J. Merrick
BY
Buckhorn, Cheatham & Blore
ATTORNEYS

Sept. 22, 1964

M. J. MERRICK 3,149,903

OPTICAL APPARATUS

Filed Dec. 29, 1960

INVENTOR.
Maurice J. Merrick
BY
Buckhorn, Cheatham & Blore
ATTORNEYS

United States Patent Office 3,149,903
Patented Sept. 22, 1964

---

3,149,903
OPTICAL APPARATUS
Maurice J. Merrick, Portland, Oreg., assignor to Tektronix, Inc., Beaverton, Oreg., a corporation of Oregon
Filed Dec. 29, 1960, Ser. No. 79,394
11 Claims. (Cl. 346—110)

This invention relates to optical apparatus and more particularly to an improved camera having provision for photographing the light pattern produced on the fluorescent screen of a cathode ray display device, such as a cathode ray tube or the like at a precise scale and in focus, and also having provision for visually observing such light pattern while eliminating parallax errors in both the visual observing and the photographing.

In order to enable detailed inspection of the light pattern produced on the fluorescent screen of a cathode ray display device, such as a cathode ray tube or an X-ray image intensifier tube, it is often necessary to make a permanent recording of such pattern which can be stored for a subsequent relatively lengthy study. This is particularly true when the pattern is the trace of a transient phenomenon appearing on the face of a cathode ray tube used in a cathode ray oscilloscope. Conventional devices used to record such a trace are photographic cameras which are supported adjacent the face of a cathode ray tube and which have provision for a viewing device for visually observing the trace as the camera is recording it on film.

One of the main disadvantages of previous recording apparatus using a photographic camera with a visual viewing device is the fact that each device has a separate light path to the face of the cathode ray tube so that parallax of the graticule pattern with respect to the trace on the phosphor of the tube results. This parallax is due to the fact that the wave form trace is axially spaced from the graticule pattern, the latter being positioned exteriorly of the cathode ray tube envelope while the trace is actually generated on a fluorescent screen coated on the inner surface of said envelope. When these patterns are visibly observed from a direction other than perpendicular to the tube face, the graticule pattern will appear to be superimposed on a different part of the fluorescent screen than is recorded by the camera positioned with its light path perpendicular to the tube face. The present invention solves this problem by utilizing a light-splitting mirror between the fluorescent screen and the camera so that one part of the light beam is transmitted through the mirror to the camera and another part of the light beam is reflected by the mirror to a visual viewing device, thereby providing a common light path between the fluorescent screen and the light-splitting mirror for both the camera and the viewing device.

Another disadvantage present in previous camera apparatus is the fact that the graticule is positioned adjacent to the outer surface of the envelope of the cathode ray tube so that said graticule is spaced from the fluorescent screen coated on the inner surface of the envelope by the thickness of the wall of the envelope. As a result of this spacing it is not possible to focus the camera on both the graticule and the fluorescent screen since they each lie in a separate parallel plane. The result is that the image of one or the other must be out of focus, since only one plane can be in focus on the image plane of the camera. This defocusing problem is solved in the present invention by removing the graticule from the front of the fluorescent screen and positioning it parallel to the axis of the camera on the side of the light-splitting mirror opposite its original position and at an effective distance from such mirror equal to the distance from the mirror to the fluorescent screen. This causes a projected image of the illuminated graticule to appear to be in the same plane as the trace on such screen, thereby enabling the focusing of both of said images by the camera while also allowing visual observation of both images without parallax.

Still another disadvantage with which the prior cathode ray tube cameras are associated is the fact that they do not provide for quickly and simply setting for a precise magnification of the recorded image or for easily changing the magnification of the recorded image. The present invention overcomes these problems by providing a camera in modular form so that it may be quickly disassembled into its various components in order to enable the interchange of lenses having different optical characteristics such as focal length and maximum f-stop rating, and the interchange of lenses having different preset magnifications built into their lens mounts for changing the scale of the recorded image. The method and apparatus for providing such interchangeability involves the use of two reference surfaces on each lens structure which are respectively positioned at fixed distances from the object plane and the image or film planes of the camera.

An object of the present invention is, therefore, to provide an improved optical apparatus having provision for presetting the magnification of interchangeable lenses when employed in such camera.

Another object of the invention is to provide an improved camera whose operation is both simple and versatile.

Another object of the present invention is the provision of an improved camera for a cathode ray display device which eliminates parallax of the graticule pattern with respect to the trace on the fluorescent screen when visually observed through a viewing device.

A further object of the present invention is to provide an improved camera for a cathode ray display device which allows both the graticule pattern and display pattern to be in focus at the same time on the film.

Another object of the present invention is the provision of an improved camera for a cathode ray display device made in modular form which enables the interchange of lenses to be performed with relative ease and rapidity so that the optical characteristics of the lens or the preset magnification of the recorded image can be changed with similar ease and rapidity.

A still further object of the present invention is the provision of a lens mounting structure for varying the magnification of the lens in an optical device while maintaining constant the respective distances from an object plane and an image plane to two reference surfaces on such lens mounting structure in order to allow lenses having different preset magnification or other optical characteristics to be interchanged.

Other objects and advantages of the present invention will appear in the following description of the preferred embodiment of the invention given in connection with the attached drawings of which:

Figure 1:
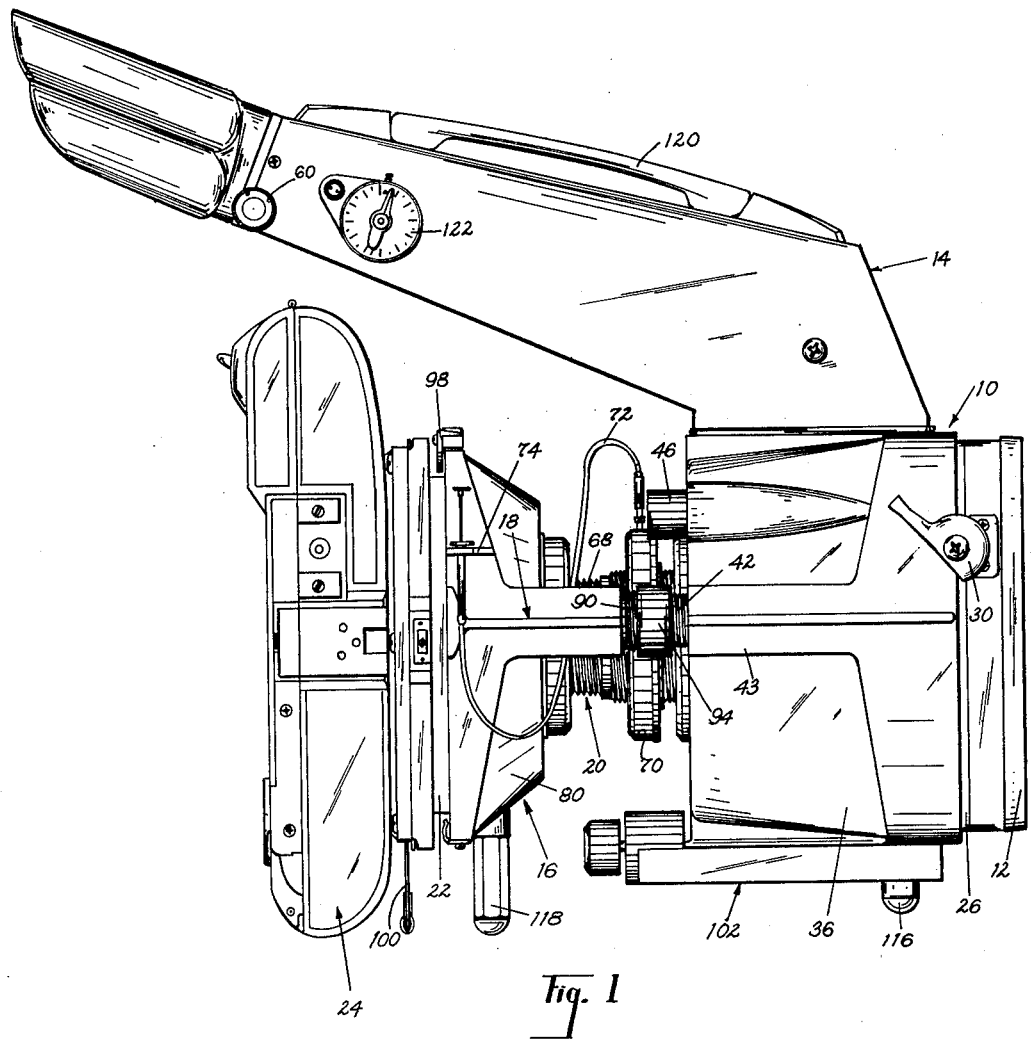
FIG. 1 is a side elevation of the oscilloscope camera of the present invention.
Figure 2:
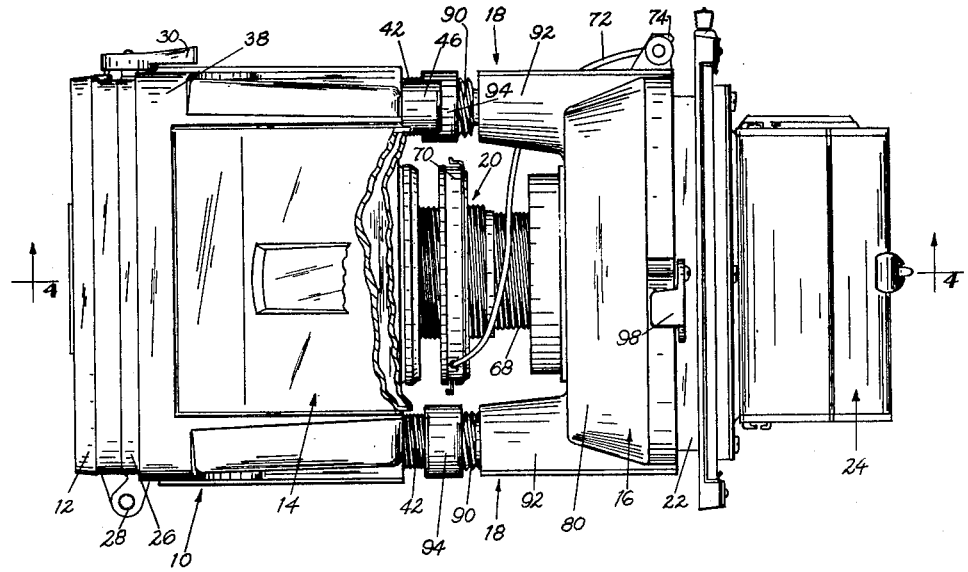
FIG. 2 is a top plan view of the camera of FIG. 1 with the viewing hood thereof partly broken away.

Referring more particularly to FIG. 1 of the drawings, the camera of the present invention includes a front portion 10 having a mounting plate 12 secured to its forward end, which mounting plate can be secured to a cathode ray oscilloscope for attaching the camera to such oscilloscope. The camera also has a viewing hood 14 secured to its top for observing the image on the phosphor of the cathode ray tube of the oscilloscope. The camera also includes a rear portion 16 attached to the forward portion by adjustable attaching structures 18, one at each side of the camera, and an interchangeable lens structure 20 held in position between the front and rear portions of the camera. The rear portion of the camera also includes a mounting plate 22 forming part of a detachable film holder 24 shown as the body portion of a commercial type of film developing camera.

Figure 3:
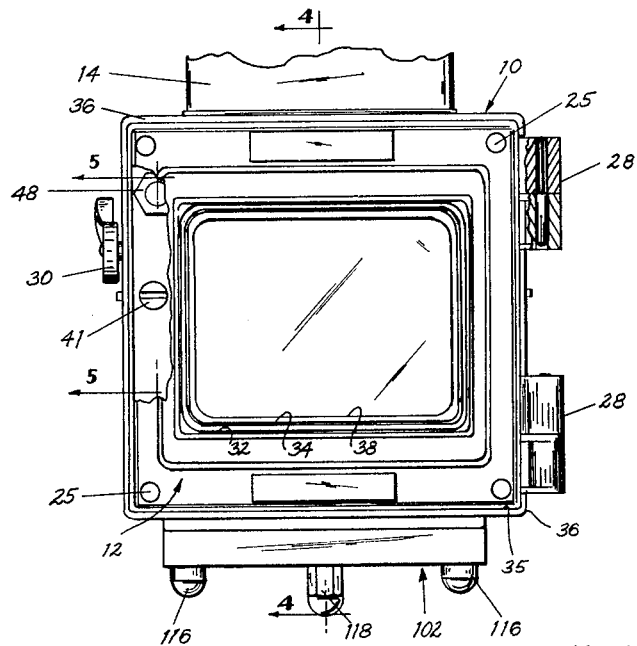
FIG. 3 is an end elevation of the camera of FIGS. 1 and 2 with the viewing hood and other parts partly broken away and looking toward the left in FIG. 1 and toward the right in FIG. 2.

The mounting plate 12 can be secured to the face of an oscilloscope by studs carried by such oscilloscope and extending through holes 25 (FIG. 3) in such plate. The mounting plate is hinged to a camera support plate 26 by hinges 28 of the detachable type so that the entire camera structure can be lifted from the mounting plate 12 when the camera is swung about the hinges 28 to move the support plate 26 away from the mounting plate 12. The support plate 26 can be latched to the mounting plate to hold such plate in contact by a latch 30 pivoted on the support plate 26 and engaging a lug on the mounting plate 12. The mounting plate 12 has an aperture 32 therein in alignment with a somewhat smaller aperture 34 in the support plate, thus providing a rim portion on the support plate surrounding the aperture 34.

Figure 5:
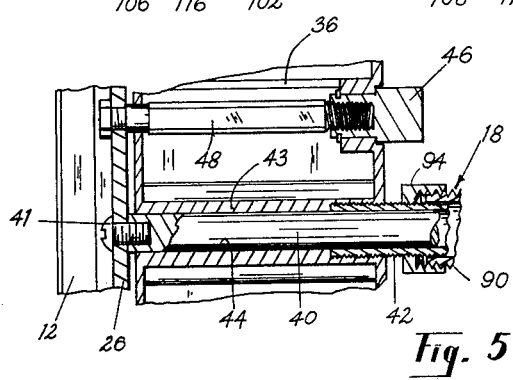
FIG. 5 is a fragmentary vertical section taken on the line 5—5 of FIG. 3.

The support plate 26 has its rim portion received in a recess 35 positioned in and extending around a corresponding rim in the front part of a front housing 36 forming part of the front portion of the camera, the rim surrounding an aperture 38 in such housing. The support plate is carried by a pair of sliding rod members 40, one at each side of the camera and one only of which is shown in FIG. 5. The forward ends of such rod members are each secured to the support plate 26 by a screw 41. The rods 40 are each received in an axially extending bore 44 in one of two laterally spaced axially extending reinforced portions 43 of the front housing 36. The rear end of each bore 44 is counterbored and threaded to receive a threaded tubular member 42 forming part of one of the attaching structures 18. The rear ends of the rods extend into the forward ends of the tubular members 42 and it will be apparent that the housing 36 is guided for axial sliding motion on the rods 40, the walls of the recess 35 in the front of such housing having sliding engagement with the inner and outer surfaces of the rim of the support plate 26.

Adjustable sliding of the housing 36 on the rods 40 is provided by a housing moving mechanism including a rotatable knob 46 journaled in the rear wall of the housing 36 and held against axial movement therein. The knob threadedly receives one end of a rod 48 having its other end secured to the support plate 26. It will be apparent that rotation of the knob 46 will move the housing 36 axially of the camera relative to the support plate 26 and mounting plate 12. Since the remainder of the camera structure is carried by the housing 36, rotation of the knob 46 will move the entire camera including the lens structure 20 and film holder 24 toward or away from an object plane indicated by the line 50 in FIGS. 4 and 6, which object plane is the plane of the phosphor of the cathode ray tube. The purpose of such adjustment is to enable a constant distance to be maintained between a reference surface 52 carried by the housing 36 and the object plane 50 to compensate for variations in cathode ray tubes as will be explained more fully below.

A mirror 54 is supported in the interior of the housing 36 and is inclined to the axis of the camera at an angle of 45° thereto. The mirror is of a transparent material, such as glass, with its lower surface 56 lightly coated with a reflecting metal so that a portion of the light entering through the aperture 38 in the housing is transmitted axially of the camera through the lens structure 20 and another portion is reflected upwardly to another mirror 57 so that the image on the object plane 50 can be viewed through the light hood 14 without parallax. A pivoted light door 58 actuated by a knob 60, shown in FIG. 1, can be opened for such viewing and closed at other times.

Figure 6:
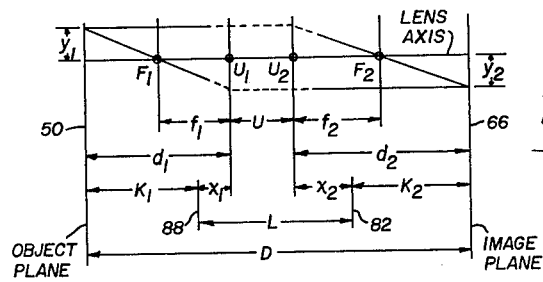
FIG. 6 is a diagram useful in explaining the operation of the camera of the present invention.
Figure 4:
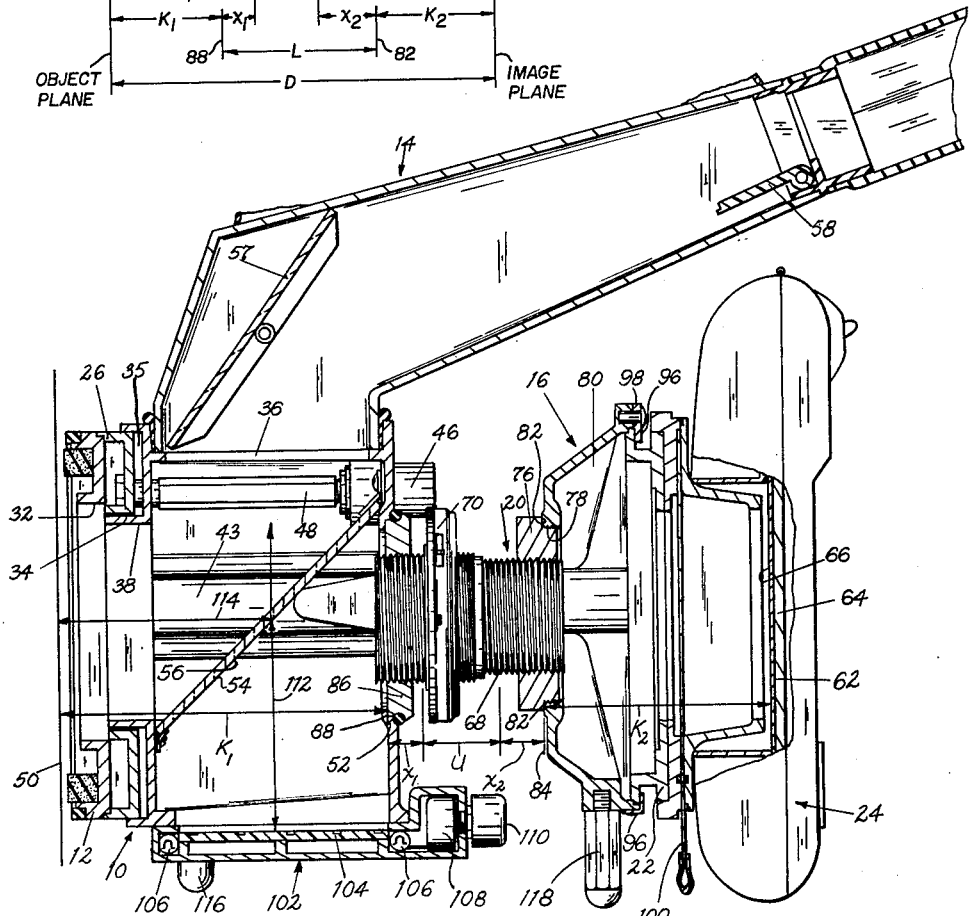
FIG. 4 is a vertical cross section through the camera taken on the lines 4—4 of FIGS. 2 and 3.

Light transmitted through the lens structure is focused on a film 62 supported by a film backing plate 64, the exposed surface of the film defining an image plane 66 also indicated in FIGS. 4 and 6. The entire camera assembly including the lens structure 20 is such that any of a series of such lens structures having the same or different preset magnification and other optical characteristics can be interchanged by merely installing such a lens structure between the front and rear portions 10 and 16, respectively, of the camera and with the adjustment by the knob 46 once being made for any given cathode ray tube, the preset magnification for such lens structure will be immediately and precisely obtained with the object plane 50 precisely focused on the image plane 66 without any further adjustments.

Each lens structure 20 includes a lens barrel 68 threaded at each end and havink any suitable shutter and light diaphragm assembly 70 intermediate its ends. A shutter operating cable 72 is shown as having one end connected to the assembly 70 and its free end held in a bracket 74 on the rear portion 16 of the camera. The interior of the lens barrel contains any suitable lens system of any desired focal length between wide limits and of any suitable speed also between wide limits.

A collar 76 is threaded upon the rear or image end of the lens barrel 68. Such collar is fixed in position upon the lens barrel, for example by a rigid adhesive, when its proper position is once determined at the factory. Such collar is screw-threaded into a threaded aperture 78 in a rear housing 80 forming part of the rear portion 16 of the camera. The collar has a radially extending image reference surface 82 abutting against a corresponding reference surface 84 on the rear housing 80 and the plane of such reference surfaces is indicated on FIG. 6 by the reference numeral 82. The front or object end of the lens barrel has a collar 86 screw-threaded thereon and such collar is also fixed in position on the lens barrel at the factory when its proper position has been determined. The collar 86 has a radially extending object reference surface 88 thereon which abuts against the reference surface 52 on the front housing 36 and referred to above. The plane of such reference surfaces is indicated on FIG. 6 by the reference character 88. The presetting of the collars 76 and 86 on the lens barrel in the camera assembly provides the preset magnification and focus discussed above in the camera structure of the present invention.

The attaching structures 18 for securing the rear portion 16 of the camera to the front portion 10 with the lens structure 20 in between, each include a tubular member 42 secured to the front housing 36 and extending axially toward the rear housing 80. Such member 42 is exteriorly threaded throughout its length. A tubular member 90 extends from and is supported in a projection 92 extending forwardly from each side of the rear housing 80 and such tubular members align with and telescope over the tubular members 42 carried by the front housing 36. The ends of the tubular members 90 remote from the rear housing 80 are exteriorly threaded with a coarser thread than the threads upon the tubular members 42. A nut 94 having interior threads fitting the threads of the tubular member 42 and other interior threads fitting the threads on the tubular member 90 is positioned on each tubular member 42, such that differential action of such threads when the nuts 94 are rotated in one direction draw the rear housing 80 toward the front housing 36 to secure such rear housing to the front housing and clamp the lens structure 20 between such housings with the reference surfaces 82 and 84 in contact and also the reference surfaces 52 and 88 in contact. Rotating the nuts 94 in the opposite direction releases the two housings from each other. The rear housing can be removed from the front housing by an axial sliding motion and one lens structure 20 can be unscrewed from the rear housing 80 and replaced by another lens structure. The rear housings can then again be secured to the front housing. As stated above, this provides a definite preset magnification and proper focus with the new lens structure without further adjustment.

The film holder 24 may be any conventional or suitable type. The attaching plate 22 thereof is preferably square and is received in a square socket 96 in the rear of the rear housing 80. A latch 98 pivoted on the upper rear portion of the housing 80 clamps the mounting plate 22 in position on such housing and can be released to enable removal of the film holder 24 from the rear housing. A removable light stop 100 is insertable into a slot in the film holder to enable removal of the film holder while loaded with film.

The object reference surface 88 on the collar 86 and the similar reference surface 52 on the front housing 36 in conjunction with the adjustment of the position of the camera relative to the object plane 50 by the knob 46 enables a fixed distance $K_1$ indicated on FIGS. 4 and 6 to be maintained between the object reference surface 88 on the lens structure and the object plane. Also the image reference surfaces 82 on the collar 76 and the similar reference surface 84 on the rear housing 80 enables a fixed distance $K_2$ to be maintained between the reference surface 82 on the lens structure and the image plane 66. Three other distances, namely $X_1$, U and $X_2$, are indicated on FIG. 4 but these distances can best be explained by reference to FIG. 6.

Any lens system having lens elements fixed in position in a lens barrel or other carrier can be considered to have four fixed points $F_1$, $U_1$, $U_2$ and $F_2$ on its axis. The point $F_1$ can be called the object focal point and is the point at which light rays parallel to the axis and entering the image end of the lens system converge. The point $F_2$ can be called the image focal point and is the point at which light rays entering the object end of the lens system converge. The point $U_1$ can be called the object unit point and is the point which is at the distance from $F_1$ at which the projection of a ray parallel to the axis and entering the lens system from the image end intersects the projection of its continuation through $F_1$. The point $U_2$ can be called the image unit point and is the point which is at the distance from $F_2$ at which the projection of a ray parallel to the axis and entering the object end of the lens intersects the projection of its continuation through $F_2$. If the object plane is in focus on the image plane it is known from elementary optics that (1) $\qquad d_1 = f_1\left(1 + \frac{1}{m}\right)$ (2) $\qquad d_2 = f_2(1 + m)$ and (3) $\qquad \frac{d_2}{d_1} = m\frac{f_2}{f_1}$ where $f_1$ is the object focal length of the lens, $f_2$ is the image focal length on the lens and $$m = \frac{y_2}{y_1}$$

where $m$ is the magnification and is considered to be positive in the above equations even though the image is reversed in passing through the lens.

As discussed above, the distances $K_1$ and $K_2$ are made constant in the camera of the present invention. The distance $K_1$ is thus the distance between the object plane 50 and the object reference surface 88 of the lens structure, the distance $K_1$ being in part set by the front housing 36 and the distance $K_2$ is the distance between the reference surface 84 on the lens structure and the image plane 66, such distance $K_2$ being in part set by the rear housing 80. The distances $X_1$ and $X_2$ for any one of a large number of lens structures having very similar or considerably different focal lengths or distances U between their unit points can be preset at the factory to give any desired magnification between wide limits and at the same time provide precise focus of the object plane upon the image plane without any adjustment of the camera except to install a given lens structure. Any lens structure within wide limits can be preset to give a precise magnification or image ratio and precise focus in the camera independently of its focal length, speed or distance between its unit points. Under these conditions the distance L between the reference surfaces on the lens structure will vary for different lenses and the same is true of the distance D between the object and image planes, but many different lenses can be preset to give the same magnification and the precise focus above discussed. The relations for any given lens are $$x_1 = f_1\left(1 + \frac{1}{m}\right) - K_1$$

and $$x_2 = f_2(1 + m) - K_2$$

as can be shown by substituting $d_1 = x_1 + K_1$ into Equation 1 above and $d_2 = x_2 + K_2$ into Equation 2 above where $x_1$ and $x_2$ are the distances of the object and image reference surfaces on the lens structure from the object and image unit points respectively.

The actual presetting of a lens is accomplished by employing one of the cameras of the present invention or a special jig having the distances $K_1$ and $K_2$ and then adjusting the collars 76 and 86 along the lens barrel until the desired present magnification is obtained with the object plane focused on the image plane. The lens structure will then produce the same result in any other camera having the same distances $K_1$ and $K_2$. Such adjustment of the collars on a series of supposedly identical lenses compensates for manufacturing tolerances which are always present. The result is that the operator knows that he has a photograph of the object to the precise scale preset for a given lens structure and with a precision oscilloscope he can scale volts or other electrical values directly from the photograph. With lenses similar to those employed in conventional cameras the magnification can be made precisely a selected value such as 1.0, .75 or .5 so that the scale of the photograph is such selected value relative to the pattern on the cathode ray tube. It is apparent that the principles of the invention described above have utility in a variety of optical applications.

The oscilloscope employed with the camera of the present invention can have a graticule in front of the screen of the cathode ray tube. Such position of the graticule results in it being out of focus when the phosphor of the oscilloscope screen is in focus. With the beam splitting mirror 54 of the present camera it is possible to position the graticule in a graticule carrier 102 in which is mounted an edge lighted graticule 104 having its surface parallel to the axis of the camera and lens structure 20. The graticule may be edge lighted by lamps 106 having their brightness controlled by a rheostat 108 mounted in the interior of the carrier 102 and varied by an external control knob 110. The graticule will appear in the same position to the camera as to the observer through the viewing hood 14 and can be fixed in a position to make it appear as if it were in the object plane 50 and thus in focus. The required relation is that the distance indicated by 112 be effectively the same as that indicated by 114 on FIG. 4.

The graticule carrier 102 may have a pair of laterally spaced support legs 116 extending downwardly therefrom and the front housing 80 may have a centrally disposed support leg 118 extending downwardly therefrom so that the camera can be supported in an upright position on a level surface when removed from the mounting plate 12 attached to the oscilloscope. It can be removed from such plate 12 by merely releasing the pivoted latch 30, swinging the camera about the hinges 28 and then lifting the camera upwardly by a handle 120 mounted on the upper portion of the viewing hood 12. A timer 122 is shown in FIG. 1 as being positioned on one side surface of the viewing hood 12 and such timer may be employed for timing the development of films in film carriers 24 having provision for developing films.

The operation of the camera is believed to be apparent from the above description. After a focus adjustment for a given cathode ray tube of an oscilloscope has once been made by rotating the knob 42 to move the entire camera toward or away from the mounting plate, the camera is always in focus for any lens structure 20 installed therein and will upon actuation of the lens shutter take a picture of the trace upon the oscilloscope phosphor at the precise scale for which the lens structure is preset, it being assumed that the light door 58 has been closed or the viewing hood closed by the face of the observer and the light stop 100 removed and also that the conventional diaphragm of the lens structure has been set to the proper $f$ stop for the film being employed.

I claim:

1. Optical apparatus comprising means for supporting an element providing an object plane, means for supporting an element providing an image plane, a lens structure positioned between said planes and having a lens system fixed in position therein, said lens structure having an object reference surface and an image reference surface thereon, means to support said lens structure so that said object reference surface is always a constant distance from said object plane and said image reference surface is always a constant distance from said image plane, said reference surfaces being fixed in position axially of said structure and being separated by a predetermined distance which varies with different lens structures so that a series of said lens structures having different lens characteristics and each providing a preset magnification can be interchanged in said apparatus while maintaining said object plane focussed upon said image plane.

2. Optical apparatus comprising means for supporting an element providing an object plane, means for supporting an element providing an image plane, a series of interchangeable lens structures each of which have a lens system fixed in position therein, each of said lens structures having an object reference surface and an image reference surface thereon, said reference surfaces being separated by a predetermined distance which varies with different ones of said series of lens structures, means to support any one of said lens structures between said planes with said object reference surface always a constant distance from said object plane and said image reference surface always a constant distance from said image plane, said reference surfaces being fixed in position on said lens structures so that lens structures each having different lens characteristics and each providing a preset magnification can be interchanged in said apparatus while maintaining said object plane focussed upon said image plane.

3. Optical apparatus comprising means for supporting an element providing an object plane, means for supporting an element providing an image plane, a lens structure including a lens barrel positioned between said planes and having a lens system fixed in position therein, said lens barrel having a collar fixed thereon providing a fixed object reference surface and a second collar fixed thereon providing a fixed image reference surface thereon, means to support said lens structure so that said object reference surface is always a constant distance from said object plane and said image reference surface is always a constant distance from said image plane, said reference surfaces being separated by a predetermined distance which varies with different lens structures so that a series of lens structures having different lens characteristics and each providing a preset magnification can be interchanged in said apparatus while maintaining said object plane focussed upon said image plane.

4. A series of interchangeable lens structures each including a lens barrel having a lens system fixed in position in said barrel, said lens barrel of each of said structures having a collar fixed thereon providing an object reference surface and a second collar fixed thereon providing an image reference surface, said surfaces being fixed in position axially of said barrel to provide a preset magnification for each of said lens structures with an object plane in focus upon an image plane when each of said lens structures is supported with its object reference surface a constant distance from said object plane and with its image reference surface a constant distance from said image plane, said reference surfaces being separated by a predetermined distance which varies with different lens structures.

5. Optical apparatus comprising a member for supporting an element providing an object plane, a member for supporting an element providing an image plane, a lens structure positioned between said planes and having a lens system fixed in position in said structure to provide an object unit point and an image unit point both fixed in position axially of said structure, said structure having an object reference surface and an image reference surface thereon, means to hold said lens structure in position with said object reference surface a constant distance $K_1$ from said object plane and said image reference surface a constant distance $K_2$ from said image plane, said object reference surface being fixed in position axially of said structure a distance from said object unit point equal to $$f_1\left(1+\frac{1}{m}\right)-K_1$$

and said image reference surface being fixed in position axially of said structure a distance from said image unit point equal to $f_2(1+m)-K_2$ where $f_1$ and $f_2$ are the object and image focal lengths of said lens structure respectively and $m$ is a desired preset magnification so that a series of lens structures differing in focal lengths or distances between their unit planes and providing the same or different magnifications can be interchanged in said apparatus while maintaining said object plane focussed upon said image plane.

6. Optical apparatus for recording a display pattern of a cathode ray display device having a fluorescent screen providing an object plane upon which said display pattern appears and having a graticule providing a graticule pattern, said apparatus comprising means to support a light sensitive recording means providing an image plane, a visual observation means for said screen, a lens structure positioned between said planes and having a lens structure fixed in position thereon, said lens structure having an object reference surface and an image reference surface thereon, means to support said lens structure so that said object reference surface is always a constant distance from said screen and said image reference surface is always a constant distance from said recording means, said reference surfaces being fixed in position axially of said structure so that a series of said lens structures having different lens characteristics and each providing a preset magnification can be interchanged in said apparatus while maintaining said screen focussed upon said recording means, a beam splitting mirror positioned between said screen and said lens structure for partially transmitting light from said screen along a first path and partly reflecting light from said screen along a second path, said observation means being positioned in one of said paths and said lens structure and said recording means being positioned in the other of said paths, said recording means and said observation means having a common light path between said screen and said mirror to eliminate parallax of an image of said graticule pattern superimposed on an image of said display pattern.

7. Optical apparatus for recording a display pattern of a cathode ray display device having a fluorescent screen upon which said display pattern appears and having a graticule providing a graticule pattern, said apparatus comprising means to support a light sensitive recording means, a visual observation means, an optical means including a beam splitting mirror for partially transmitting along a first light path and partially reflecting along a second light path light from said display pattern, said recording means being positioned in one of said light paths and said observation means being positioned in the other of said paths, said recording means and said observation means having a common light path between said display device and said mirror in order to eliminate parallax of an image of said graticule pattern superimposed on said display image, said graticule being positioned on the opposite side of said mirror from said fluorescent screen and in alignment with said second path, said graticule being the same effective distance from said mirror as said screen so that its image appears in focus superimposed on said screen in said observation means and on said recording means.

8. Optical apparatus for recording a display pattern of a cathode ray device having a fluorescent screen upon which said pattern appears and having a graticule providing a graticule pattern, said appaartus comprising means to support a light sensitive recording means, a visual observation means, an optical viewing means including a beam splitting mirror for partially transmitting along a first light path and partially reflecting along a second light path light from said display pattern, said recording means being positioned in said first light path and said observation means being positioned in said second light path, said recording means and said observation means have a common light path between said display device and said mirror in order to eliminate parallax of the image of said graticule pattern superimposed on said display image, said graticule being positioned in the other side of said mirror from said screen out of alignment with said first path and in alignment with said second path, said graticule being the same effective distance from said mirror as said screen so that its image appears superimposed on said screen in said observation means and on said recording means to eliminate defocusing of said graticule image.

9. Optical apparatus for recording a display pattern of a cathode ray display device having a fluorescent screen upon which said pattern appears, said apparatus comprising a light sensitive recording means, a visual observation means, a beam-splitting mirror for partially transmitting along a first light path and partially reflecting along a second light path light from said display pattern, a lens structure between said mirror and said recording means for focussing said display pattern upon said recording means, said lens structure and said recording means being positioned in one of said light paths and said observation means being positioned in the other of said light paths, and means for projecting the light image of a graticule pattern positioned on the opposite side of said mirror from said fluorescent screen and in alignment with said second path and being positioned a distance from said mirror which is equal to the effective distance from said mirror to said screen so that the image of said graticule pattern reflected from said mirror to said recording means is recorded on said recording means in focus, and is superimposed on the image of the display pattern on said recording means and in said observation means without parallax thereby eliminating parallax and defocussing of said graticule image.

10. A lens structure comprising a lens system fixed in position in said structure, an object reference surface and an image reference surface on said structure, and means for adjusting the location of the reference surfaces with respect to each other and to said lens system in order to set said reference surfaces in a fixed position axially of said lens system so that said reference surfaces are separated by a predetermined distance which varies with different lens systems, to provide a preset magnification for said structure with an object plane in focus upon an image plane when said lens structure is supported with its object reference surface a constant distance from said object plane and with its image reference surface a constant distance from said image plane regardless of the magnification and the characteristics of the lens systems.

11. A lens structure comprising a lens, a support member for holding said lens, a pair of stop members attached to said support member and spaced along the axis of said lens to provide an image reference surface on one of said stop members and an object reference surface on the other of said stop members, and means for varying the distance between said pair of stop members to change the location of said reference surfaces with respect to said lens to set said object reference surface a constant distance from a fixed object plane and to set said image reference surface a constant distance from an image plane with said object plane in focus on said image plane, even though the spacing of said lens from said object and image planes varies for lenses having different focal lengths, and for different degrees of magnification.

References Cited in the file of this patent
UNITED STATES PATENTS

| | | |
|---|---|---|
| 1,859,207 | Howell | May 17, 1932 |
| 2,483,147 | Mol | Sept. 27, 1949 |
| 2,725,803 | Tansel | Dec. 6, 1955 |
| 2,751,275 | Mansberg | June 19, 1956 |